W. HARBAUGH.
Device for Obtaining Miter Bevels.
No. 211,235. Patented Jan. 7, 1879.
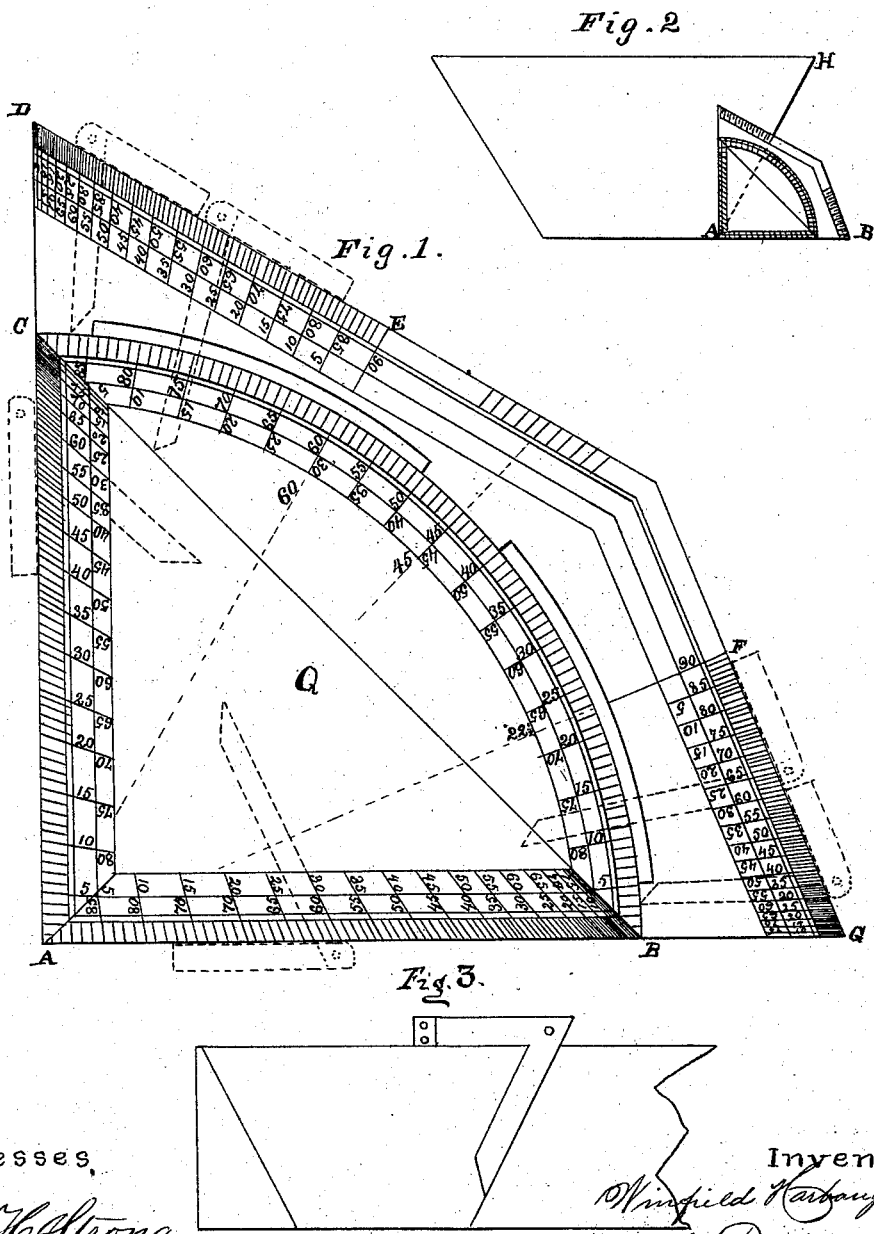

UNITED STATES PATENT OFFICE.

WINFIELD HARBAUGH, OF ALAMEDA, CALIFORNIA.

IMPROVEMENT IN DEVICES FOR OBTAINING MITER-BEVELS.

Specification forming part of Letters Patent No. 211,235, dated January 7, 1879; application filed August 9, 1878.

*To all whom it may concern:*

Be it known that I, WINFIELD HARBAUGH, of Alameda, county of Alameda, and State of California, have invented a Mitrometer; and I do hereby declare the following to be a full, clear, and exact description thereof, reference being had to the accompanying drawings.

My invention relates to a novel device for obtaining miter-bevels for joints in the construction of anything standing in an oblique or inclined position, the plan of which is either quadrangular, hexagonal, or octagonal in outline; and it consists of a plate of any suitable substance, having certain scales marked or engraved upon it, so that by the use of instruments called "bevels" I am enabled to accurately fix the angle at which the bevel of both edges and surface of the boards may be accurately cut, so as to be perfectly level, without the necessity of further measuring.

This instrument I call a "mitrometer," and it is provided with stubs at the fixed points hereinafter described, to facilitate the adjustment of the movable bevels to the varying angles. Slots are cut through the plate on the line of the quadrant, so that the object measured may be seen through them to facilitate the taking of the angles.

Referring to the accompanying drawings, Figure 1 shows the mitrometer and its method of application. Fig. 2 shows the method of measuring the angle at the end of a box or other object. Fig. 3 shows the application of bevels to the surface and edge of board after adjustment by the mitrometer.

The letters B A H, Fig. 2, may, for example, represent the angle of inclination of a box. The instrument is provided with a quadrant, Q, of graduated degrees, and is placed upon the angle that one side or end of the box makes with a bevel-line, as shown, and the degree of inclination on which it stands is indicated by the figures in the quadrant on the mitrometer.

On the side A B, Fig. 1, of the mitrometer is constructed a proportional angulated scale, having C as a fixed point at the extremity of the radius of the quadrant C B, to which all the varying angles on the side A B converge, and which are numbered with figures to correspond with the degrees of inclination on the quadrant. From this proportional scale any bevel is obtained that will give the direction for a miter cut across the surface of a board, that will stand to the required degree of obliquity, and be perfectly square and level in construction.

On the side A C, Fig. 1, of the mitrometer is constructed another proportional angulated scale, having B as a fixed point at the extremity of the radius of the quadrant B C, to which all the varying angles marked on the side A C converge, and all numbered, as on the side A B, to correspond with the number of degrees of inclination indicated on the quadrant. From this proportional scale any bevel may be obtained that will give the direction for a miter cut across the edge of a board, that will stand to the required degree of obliquity, and be perfectly square and level in construction. For example, let the inclination of one side or end of the proposed box be sixty degrees, as indicated by the quadrant on the mitrometer-plate, Fig. 2: To obtain the directing-bevel to mark for a miter cut across the surface of a board, by reading the scale from B toward A, Fig. 1, the number 60 will be found, which corresponds with the number of degrees of inclination of the proposed box. A movable bevel may then be fixed to the angle formed by A, 60, and C, as shown, which will give the fixed miter-angle required on the surface of the board.

To obtain the other directing-bevel to mark for a miter, cut across the edge of a board to be used in conjunction with the above-described bevel. The scale may be read off from A toward C, Fig. 1, until the number 60 is found. Now another common bevel is fixed to the angle formed by A, 60, and B, as shown, which gives the required miter-angle on the edge of the board.

For fixed bevels to mark miter-joints for oblique hexagonal figures, another scale is used on the same instrument, as shown. Upon the half of one side of a hexagonal polygon, as at D E, Fig. 1, is constructed a proportional angulated scale, having A as a fixed point, to which all the varying angles on the side D E converge, and are numbered to correspond with the number of degrees of inclination on the quadrant B C. From this proportional scale any two bevels are obtained that will give the direction for a miter cut across the surface and edge of a board, that will make any oblique hexagonal figure, and be perfectly level in construction. For example, let the inclination of one side of a proposed hexagonal box be sixty degrees, as indicated by the quadrant on the mitrometer.

To obtain a directing-bevel to mark for a miter cut across the surface of a board, the scale must be read from D toward E until the number 60 is found, which corresponds with the number of degrees of inclination of proposed box. A common movable bevel is fixed to the angle formed by E, 60, and A, as shown, which gives the miter-angle required on the surface of the board.

To obtain the other directing-bevel to mark for miter cut across the edge of a board to be used in conjunction with the preceding described bevel, the scale must be read from E toward D until the number 60 is found. Now a movable bevel may be fixed to the angle formed by E, 60, and A, as shown, which is the miter-angle required on the edge of the board.

In order to obtain fixed bevels for oblique octagonal figures, another scale is used. Upon the half of one side of an octagonal polygon, as F G, is constructed a proportional angulated scale, having A as a fixed point, to which all the varying angles on the side F G converge, and are numbered to correspond with the number of degrees of inclination on the quadrant B C. From this proportional scale any two bevels are obtained that will give the direction for a miter across the surface and edge of board, that will make any oblique octagonal figure, and be perfectly level in construction. For example, let the inclination of one side of a proposed octagonal box be sixty degrees, as indicated by the quadrant on the mitrometer. To obtain a directing-bevel to mark for a miter cut across the surface of a board, read the scale from G toward F until the number 60 is found, which corresponds with the number of degrees of inclination of the proposed box. Then the movable bevel may be fixed to the angle formed by F, 60, and A, as shown, which gives the angle required for a miter across the surface of the board.

To obtain the other directing-bevel to mark for a miter cut across the edge of the board, in conjunction with the bevel referred to, the scale must be read from F toward G until a number 60 is found. Now a movable bevel may be fixed to the angle formed by F, 60, and A, which gives the required angle for a miter across the edge of the board.

Having thus described my invention, what I claim as new, and desire to secure by Letters Patent, is—

1. The quadrant Q, provided with the proportional angulated scale fixed upon the right-angled radii of said quadrant, and having B C as fixed points, to which all the angles on the proportional scale alternately converge, substantially as and for the purpose herein described.

2. The quadrant Q, provided with the proportional angulated scale fixed upon a part of the perimeter of an octagonal or hexagonal figure, and having the center A as a fixed point, to which all the angles on the proportional scale converge, substantially as and for the purpose herein described.

In witness whereof I hereunto set my hand and seal.

WINFIELD HARBAUGH. [L. S.]

Witnesses:
FRANK A. BROOKS,
GEO. H. STRONG.